United States Patent
Yu et al.

(10) Patent No.: US 8,534,899 B2
(45) Date of Patent: Sep. 17, 2013

(54) BACKLIGHT MODULE AND ITS LIGHT GUIDE PLATE MODULE

(75) Inventors: Ya-jun Yu, Shenzhen (CN); Guofu Tang, Shenzhen (CN); Yi-cheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 90 days.

(21) Appl. No.: 13/263,904

(22) PCT Filed: Jul. 12, 2011

(86) PCT No.: PCT/CN2011/077066
§ 371 (c)(1),
(2), (4) Date: Oct. 11, 2011

(87) PCT Pub. No.: WO2012/139339
PCT Pub. Date: Oct. 18, 2012

(65) Prior Publication Data
US 2012/0262942 A1    Oct. 18, 2012

(30) Foreign Application Priority Data
Apr. 12, 2011 (CN) .......................... 2011 1 0091276

(51) Int. Cl.
*F21V 7/04* (2006.01)
*F21V 15/00* (2006.01)

(52) U.S. Cl.
USPC ............ 362/616; 362/607; 362/612; 362/362

(58) Field of Classification Search
USPC ............... 362/561, 612, 555, 511, 97.2, 97.3, 362/330, 613, 616, 628; 385/146, 901; 349/65, 349/69, 67
See application file for complete search history.

(56) References Cited

U.S. PATENT DOCUMENTS

| | | | | |
|---|---|---|---|---|
| 5,050,946 A * | 9/1991 | Hathaway et al. | ............... | 385/33 |
| 5,202,950 A * | 4/1993 | Arego et al. | ................... | 385/146 |
| 6,464,367 B2 * | 10/2002 | Ito et al. | ........................ | 362/613 |
| 6,927,812 B2 * | 8/2005 | Cho | ............................... | 349/65 |
| 2004/0114396 A1 * | 6/2004 | Kobayashi et al. | ............ | 362/561 |
| 2004/0183962 A1 | 9/2004 | Hua-Nan et al. | | |
| 2006/0262568 A1 * | 11/2006 | Blom et al. | .................... | 362/625 |
| 2010/0214506 A1 * | 8/2010 | Gaides et al. | ................... | 349/61 |
| 2012/0026423 A1 * | 2/2012 | He et al. | .......................... | 349/62 |
| 2012/0268691 A1 * | 10/2012 | Kuo et al. | ....................... | 349/65 |

FOREIGN PATENT DOCUMENTS

| | | |
|---|---|---|
| CN | 101509636 | 8/2009 |
| CN | 101609230 | 12/2009 |
| CN | 101956936 | 1/2011 |

(Continued)

*Primary Examiner* — Diane Lee
*Assistant Examiner* — Kenny C Sokolowski
(74) *Attorney, Agent, or Firm* — Muncy, Geissler, Olds & Lowe, PLLC

(57) ABSTRACT

The present invention discloses a backlight module and its light guide plate module. The light guide plate module comprises a plurality of adjacently arranged light guide plates, each of the light guide plates includes a light emitting surface and at least one light entrance surface, and the light emitting surfaces of the light guide plates are on a same plane. The present invention employs the arrangement of a plurality of modular light guide plates to achieve a large light emitting area. Each of the light guide plates corresponds to an independently controlled light emitting module, respectively, so that the side-light type backlight module can realize local dimming function.

5 Claims, 5 Drawing Sheets

(56) References Cited

FOREIGN PATENT DOCUMENTS

| CN | 201777997 | 3/2011 |
| JP | 11024075 | 1/1999 |
| JP | 2004178850 | 6/2004 |
| WO | WO2011007305 | 1/2011 |

\* cited by examiner

BACKLIGHT MODULE AND ITS LIGHT GUIDE PLATE MODULE

CROSS-REFERENCE TO RELATED APPLICATIONS

This application is the National Stage of International Application No. PCT/CN2011/077066 filed Jul. 12, 2011, which claims the benefit of Chinese Application No. 201110091276.1, filed Apr. 12, 2011, the disclosures of which are incorporated herein by reference in their entireties.

BACKGROUND OF THE INVENTION

1. Field of Invention

The present invention relates to a backlight module and more particularly to a side-light type backlight module and its light guide plate module for being applied to local dimming technology.

2. Related Art

Local dimming is a technology for backlight source of a liquid crystal display to produce different changes of brightness on different areas of a light emitting surface. It has the advantages of enhancing the screen contrast to further improve the image quality. In general, local dimming technology is mainly applied to direct-light-type backlight module, particularly in backlight modules which employ light emitting diodes (LEDs) as the light source. Changes of brightness on specific areas are achieved by controlling the LED's brightness on different areas.

Although the combined applications of direct-light-type LED backlight module and local dimming technology can reduce power consumption and enhance screen contrast. On the contrary, the control system for LED is rather complicated, so that the costs for circuit design are increased.

Side-light type backlight modules produce planar light source via a single light guide plate, therefore it cannot control the brightness of specific areas even if local dimming technology is applied. Furthermore, it is technically difficult to manufacture single light guide plates with large area for backlight modules of large sized liquid crystal displays, the costs are therefore expensive. In addition, large sized light guide plates are easily deflected by external forces to affect the optical performance.

In order for side-light type backlight modules to be used with local dimming technology, the solution is to apply a plurality of light guide plates with independent light source control. In the R&D process, the application of a plurality of light guide plates is structurally and practically difficult to joint them flatly and evenly. Adjacent light guide plates will detach/displace and offset from each other if they are impacted by external forces or if the backlight modules are placed upside down. This will result in deformation of the backlight module sheets to affect the light emitting effects.

Therefore, it is necessary to provide a backlight module and its light guide plate module to tackle the current technical problems.

SUMMARY OF THE INVENTION

The present invention provides a backlight module and its light guide plate module to tackle the problem that side-light type backlight modules cannot achieve local dimming function.

A primary object of the present invention is to provide a light guide plate module to achieve adequate large light emitting area for realizing local dimming, function by the arrangement of a plurality of modular light guide plates.

A secondary object of the present invention is to provide a backlight module, wherein a light guide plate module is securely disposed on a back-plate component of the backlight module to achieve adequate large light emitting area for realizing local dimming function. At the same time, it can effectively avoid the problem that adjacent light guide plates will offset vertically because of external forces.

The object of the present invention is realized by providing a light guide plate module which comprises:

a flat light guide plate having: a first side and a second side opposite to each other; a light, emitting surface disposed between the first side and the second side; and two light entrance surfaces disposed at the first side and the second side, respectively; and two wedge-shaped light guide plates disposed closely adjacent to the first side and the second side of the flat light guide plate, respectively, wherein each wedge-shaped light guide plate has a light emitting surface and a light entrance surface, the light emitting surfaces of the wedge-shaped light guide plates and the light emitting surface of the flat light guide plate are on a same plane, and the light entrance surfaces of the wedge-shaped light guide plates are relatively away from the light entrance surfaces of the flat light guide plate.

In one of the embodiments of the present invention, the flat light guide plate also includes two joint surfaces, wherein each of the joint surfaces is formed between the light emitting surface and the corresponding light entrance surface of the flat light guide plate. Each wedge-shaped light guide plate also includes a joint portion, wherein the joint portion is relatively away from the light entrance surface of the wedge-shaped light guide plate, and is correspondingly adhered on the joint surface of the flat light guide plate.

In one of the embodiments of the present invention, the joint portion is adhered on the joint surface by a double-sided reflecting tape.

The present invention also provides a backlight module, wherein the backlight module comprises:

a frame component;

a light guide plate module disposed on the frame component and including a plurality of adjacently arranged light guide plates, wherein each of the light guide plates includes a light emitting surface and at least one light entrance surface, and the light emitting surfaces of the light guide plates are on a same plane; and a plurality of light emitting modules disposed on the frame component and facing the light entrance surfaces of the light guide plates, respectively, so as to correspondingly provide independently controlled incident light source.

In one of the embodiments of the present invention, the light guide plate module comprises:

a flat light guide plate disposed at the center of the frame component and including: a first side and a second side opposite to each other; a light emitting surface disposed between the first side and the second side; and two light entrance surfaces disposed at the first side and the second side, respectively; and two wedge-shaped light guide plates disposed separately on the frame component and closely adjacent to the first side and the second side of the flat light guide plate, respectively, wherein each of the wedge-shaped light guide plates has a light emitting surface and a light entrance surface, and the light entrance surfaces of the wedge-shaped light guide plates are relatively away from the light entrance surfaces of the flat light guide plate.

In one of the embodiments of the present invention, a double-sided reflecting tape is disposed on the bottom of each of the light guide plates to securely adhere on the frame component.

In one of the embodiments of the present invention, the flat light guide plate also includes two joint surfaces, wherein each of the joint surfaces is formed between the light emitting surface and the corresponding light entrance surface of the flat light guide plate; each of the wedge-shaped light guide plates also includes a joint portion, wherein the joint portion is relatively away from the light entrance surface of the wedge-shaped light guide plate, and is correspondingly adhered on the joint surface of the flat light guide plate, in one of the embodiments of the present invention, the joint portion is adhered on the joint surface by a double-sided reflecting tape.

In one of the embodiments of the present invention, vertical contact portions of the adjacent light guide plates are glued together with UV-curable adhesive.

In one of the embodiments of the present invention, the frame component is a single frame, a single back-plate, or a combination of a frame and a back-plate.

Mainly with the arrangement of a plurality of light guide plates, the present invention can provide adequate large light emitting area for application in large sized liquid crystal displays, and at the same time, local dimming function can also be realized. Furthermore, the present invention employs double sided reflecting tapes for securing the adjacent light guide plates, so that the overall structure can stand against external impact. At the same time, it is less required thr using reflecting plates and the production costs are reduced.

DETAILED DESCRIPTION OF THE INVENTION

The structure and the technical means adopted by the present invention to achieve the above and other objects can be best understood by referring to the following detailed description of the preferred embodiments and the accompanying drawings. Moreover, the following terms mentioned in the present invention, for instances, upper, lower, front, rear, left, right, inside, outside, lateral side, etc, are for directions in connection with the figures attached. Therefore, these direction terms are used to explain and help to comprehend the present invention, but not as limitations thereof.

Figure 1:
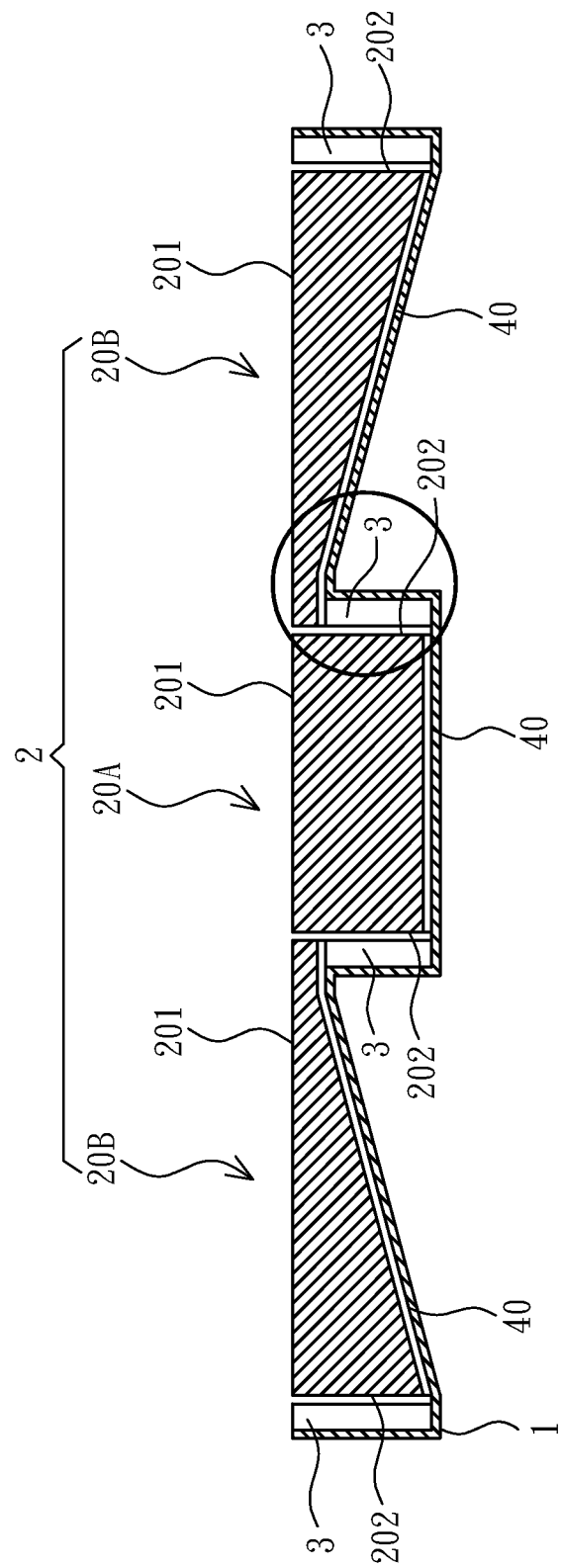
FIG. 1 is a lateral view of a first embodiment of a backlight module of the present invention.
Figure 2:
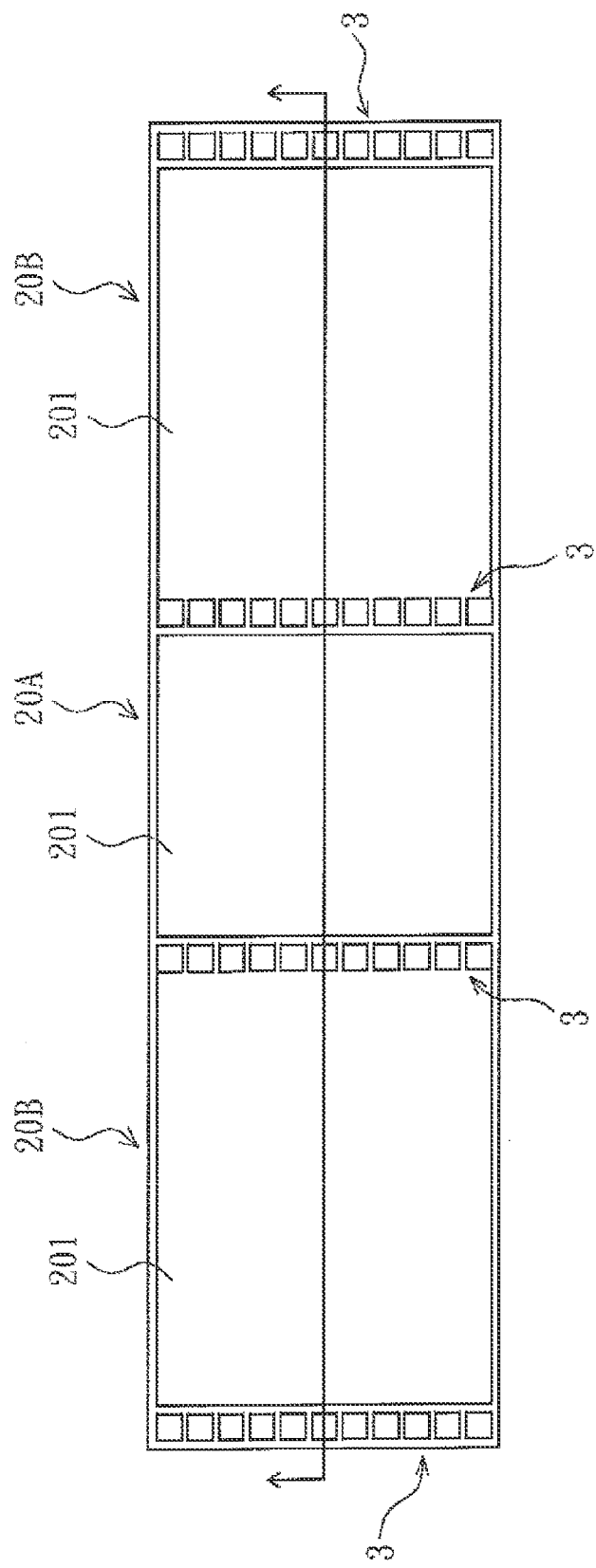
FIG. 2 is a top view of FIG. 1.

Referring to FIGS. 1 and 2. FIG. 1 is a lateral view of a first embodiment of a backlight module of the present invention, while FIG. 2 is a top view of FIG. 1. The present invention of a backlight module comprises a frame component 1, a light guide plate module 2 and a plurality of light emitting modules 3.

The frame component 1 can be a single frame, a single back-plate or a combination of a frame and a back-plate.

The light guide plate module 2 is disposed on the frame component 1 and includes a plurality of adjacently arranged light guide plates 20A and 20B. Each light guide plate 20A and 20B includes a light emitting surface 201 and at least one light entrance surface 202, and the light emitting surfaces 201 of the light guide plates 20A and 20B are on a same plane. In the first embodiment as shown in FIG. 1, the light guide plate module 2 includes a flat light guide plate 20A and two wedge-shaped light guide plates 20B. In this embodiment, a double-sided reflecting tape 40 is disposed on the bottom of each light guide plates 20A and 20B for adhering the light guide plates 20A and 20B on the frame component 1 securely. In this embodiment, the double-sided reflecting tape 40 can reflect the light inside the corresponding light guide plates 20A and 20B. The best choice is double-sided tapes with a single reflecting surface, but not as a limitation thereof.

The flat light guide plat, 20A is disposed at the center of the frame component 1. The flat light guide plate 20A includes: a first side and a second side opposite/corresponding to each other, a light emitting surface 201 and two light entrance surfaces 202, wherein the light emitting surface 201 is disposed between the first side and the second side, while the two light entrance surfaces 202 are disposed at the first side and the second side, respectively. The two wedge-shaped light guide plates 20B are also disposed separately on the frame component 1, and are closely adjacent to the first side and the second side of the flat light guide plate 20A, respectively, wherein each wedge-shaped light guide plate 20B has a light emitting surface 201 and a light entrance surface 202. The light entrance surfaces 202 of the wedge-shaped light guide plates 20B are relatively away from the light entrance surfaces 202 of the flat light guide plate 20A. It is important to note that, the quantity and arrangement of the light guide plates in this embodiment are merely for explaining and comprehending the present invention, not as limitations for the quantity and arrangement mode thereof.

The light emitting modules 3 are disposed on the frame component 1. The light emitting modules 3 are facing the light entrance surfaces 202 of the light guide plates 20A and 20B respectively, and to provide independently controlled incident light source correspondingly; so that the present invention of a backlight module is able to realize local dimming function. As shown in FIG. 2, each light emitting module 3 includes a plurality of light emitting units.

Figure 3:
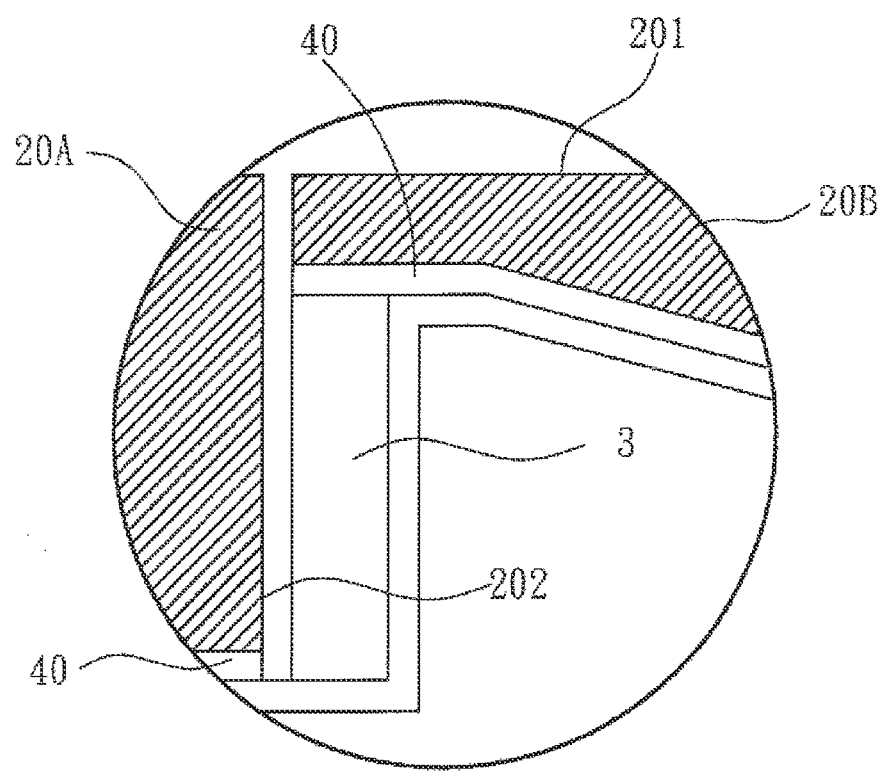
FIG. 3 is partially enlarged view of FIG. 1.

Referring to FIG. 3, in the first embodiment mentioned above, the light emitting modules 3 corresponding to the light entrance surfaces 202 of the two sides of the flat light guide plate 20A are adhered securely by the double-sided reflecting tape 40 on the bottom of the wedge-shaped light guide plates 20B. Furthermore, vertical contact portions of the adjacent light guide plates 20A and 20B are glued together with UV-curable adhesive.

According to the above-mentioned first embodiment, the present invention mainly employs the arrangement of a plurality of modular light guide plates 20A and 20B to form a large light emitting area for a backlight module to be feasible to apply in large sized liquid crystal displays, and at the same time local dimming function can also be realized by independently controlling the light emitting modules 3. Furthermore, the light guide plates 20A and 20B are securely disposed on the frame component 1 by using the double-sided reflecting tape 40, so as to effectively avoid the problems of detachment/displacement and offsetting of the adjacent light guide plates 20A and 20B because of external forces.

Figure 4:
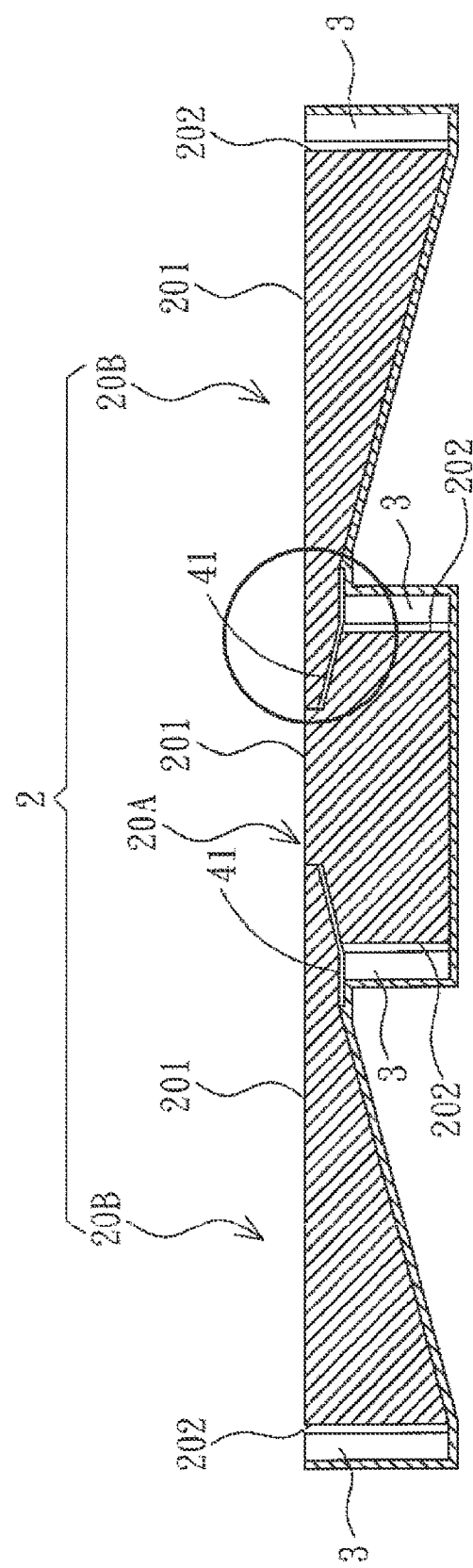
FIG. 4 is a lateral view of a second embodiment of a backlight module of the present invention.
Figure 5:
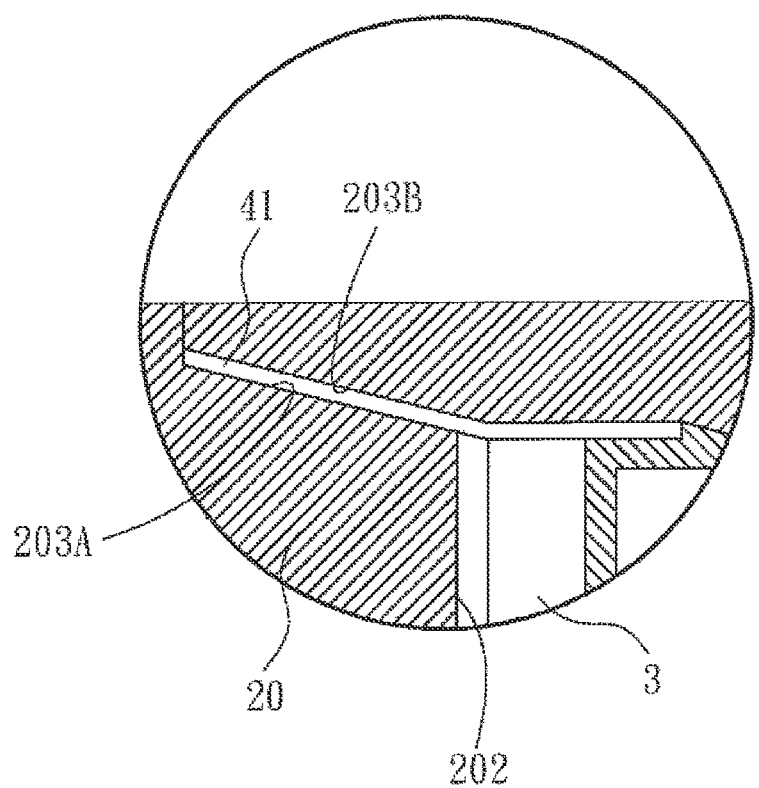
FIG. 5 is a partially enlarged view of FIG. 4.

Referring to FIGS. 4 and 5, FIG. 4 is a lateral view of a second embodiment of a backlight module of the present invention, while FIG. 5 is a partial enlarged view of FIG. 4. The second embodiment of the present invention is similar to the first embodiment, and thus the names and numbers of the elements are substantially the same. The different feature of the second embodiment of the present invention is that: the flat light guide plate 20A also includes two joint surfaces 203A, wherein each joint surface 203A is formed between the light emitting surface 201 and the corresponding light entrance surface 202 of the flat light guide plate 20A; each wedge-shaped light guide plate 20B also includes a joint portion 203B, wherein the joint portion 203B is relatively away from the light entrance surface 202 of the wedge-shaped light guide plate 20B, and is correspondingly adhered on the joint surface 203A of the flat light guide plate 20A.

In addition, a double-sided reflecting tape 41 is the best for adhering the joint portion 203B on the joint surface 203A. The double-sided reflecting tape 41 achieves an effect of adhering the light guide plates 20A, and 20B together securely, besides, it can also reflect the light inside each light guide plate independently to ensure that the light in different areas do not affect each other.

Based on the abovementioned specification, in comparing to the existing side-light type backlight modules, which cannot realize local dimming function and it is technically difficult to manufacture single light guide plates with large area for applying in large sized backlight modules; the present invention employs the arrangement of a plurality of modular light guide plates to form a large light emitting area for a side-light type backlight module to be able to apply in large sized liquid crystal displays, and at the same time, local dimming function can also be realized. Furthermore, the present invention employs a means of the double-sided reflecting tapes for securing the light guide plates, not only the overall structure of the light guide plates can stand against external impact, but it is also less required for using reflecting plates and the production costs are reduced.

The present invention has been described with preferred embodiments thereof and it is understood that many changes and modifications to the described embodiments can be carried out without departing from the scope and the spirit of the invention that is intended to be limited only by the appended claims.

What is claimed is:

1. A backlight module, characterized in that said backlight module comprises:
a frame component;
a light guide plate module disposed on said frame component and including a plurality of adjacently arranged light guide plates, wherein said adjacently arranged light guide plates are a flat light guide plate and two wedge-shaped light guide plates, wherein said flat light guide plate is disposed at the center of said frame component and includes: a first side and a second side opposite to each other, a light emitting surface disposed between said first side and said second side, and two light entrance surfaces disposed at said first side and said second side, respectively; said wedge-shaped light guide plates are disposed separately on said frame component and are closely adjacent to said first side and said second side of said flat light guide plate, respectively; each of the wedge-shaped light guide plates has a light emitting surface and a light entrance surface; said light emitting surfaces of said wedge-shaped light guide plates and said flat light guide plate are on a same plane; said light entrance surface of said wedge-shaped light guide plates are relatively away from said light entrance surfaces of said flat light guide plate, bottoms of said flat light guide plate and said wedge-shaped light guide plates have double-sided reflecting tapes to adhere securely on said frame component; and
a plurality of light emitting modules disposed on said frame component and facing said light entrance surfaces of said light guide plates, respectively, so as to correspondingly provide independently controlled incident light source, wherein said light emitting modules corresponding to said light entrance surfaces of said flat light guide plate are adhered securely by said double-sided reflecting tape on the bottom of said wedge-shaped light guide plates.

2. The backlight module as claimed in claim 1, characterized in that: said flat light guide plate also includes two joint surfaces, wherein each of said joint surfaces is formed between said light emitting surface and the corresponding light entrance surface of said flat light guide plate, each of said wedge-shaped light guide plates also includes a joint portion, wherein said joint portion is relatively away from said light entrance surface of said wedge-shaped light guide plate, and is correspondingly adhered on said joint surface of said flat light guide plate.

3. The backlight module as claimed in claim 2, characterized in that: said joint portion is adhered on said joint surface by a double sided reflecting tape.

4. The backlight module as claimed in claim 1, characterized in that: vertical contact portions of said adjacent light guide plates are glued together with UV-curable adhesive.

5. The backlight module as claimed in claim 1, characterized in that: said frame component is a single frame, a single back-plate, or a combination of a frame and a back-plate.

* * * * *